United States Patent
Kim

(10) Patent No.: US 9,688,829 B2
(45) Date of Patent: Jun. 27, 2017

(54) COMPOSITION FOR FOAM TIRE

(71) Applicant: Young-Gi Lee, Gimhae-si, Gyeongsangnam-do (KR)

(72) Inventor: Hee sook Kim, Gimhae-si (KR)

(73) Assignee: Young-Gi Lee, Gimhae (KR)

( * ) Notice: Subject to any disclaimer, the term of this patent is extended or adjusted under 35 U.S.C. 154(b) by 156 days.

(21) Appl. No.: 14/407,964

(22) PCT Filed: Jul. 19, 2013

(86) PCT No.: PCT/KR2013/006480
§ 371 (c)(1),
(2) Date: Dec. 15, 2014

(87) PCT Pub. No.: WO2014/014306
PCT Pub. Date: Jan. 23, 2014

(65) Prior Publication Data
US 2015/0166755 A1 Jun. 18, 2015

(30) Foreign Application Priority Data
Jul. 20, 2012 (KR) ........................ 10 2012 0079231

(51) Int. Cl.
| | |
|---|---|
| *C08J 9/00* | (2006.01) |
| *B60C 1/00* | (2006.01) |
| *C08J 9/04* | (2006.01) |
| *C08L 53/00* | (2006.01) |
| *C08L 7/00* | (2006.01) |
| *C08L 21/00* | (2006.01) |

(52) U.S. Cl.
CPC ............. *C08J 9/0061* (2013.01); *B60C 1/00* (2013.01); *C08J 9/04* (2013.01); *C08L 7/00* (2013.01); *C08L 53/00* (2013.01); *C08J 2353/00* (2013.01); *C08J 2353/02* (2013.01); *C08J 2407/00* (2013.01); *C08J 2409/06* (2013.01); *C08L 21/00* (2013.01); *Y02T 10/862* (2013.01)

(58) Field of Classification Search
CPC .... B60C 1/00; C08J 9/0061; C08J 9/04; C08J 2353/00; C08J 2353/02; C08J 2407/00; C08J 2409/06; C08L 53/00; C08L 7/00; C08L 21/00; Y02T 10/862
See application file for complete search history.

(56) References Cited

U.S. PATENT DOCUMENTS

| | | | |
|---|---|---|---|
| 5,824,400 | A | 10/1998 | Petrakis et al. |
| 5,968,427 | A | 10/1999 | Teratani |
| 2006/0199906 | A1 | 9/2006 | Walton et al. |
| 2007/0142565 | A1 | 6/2007 | Chaudhary et al. |
| 2011/0143112 | A1 | 6/2011 | Cai et al. |
| 2012/0316280 | A1* | 12/2012 | Meyer ................ B65D 39/0011 524/432 |
| 2013/0184402 | A1 | 7/2013 | Horikawa et al. |

FOREIGN PATENT DOCUMENTS

| | | |
|---|---|---|
| CN | 1290596 A | 4/2001 |
| CN | 102010534 A | 4/2011 |
| EP | 0323653 A1 | 7/1989 |
| EP | 0654363 A1 | 5/1995 |
| JP | 08-208869 A | 8/1996 |
| JP | 09-157426 A | 6/1997 |
| JP | 2000-62407 A | 2/2000 |
| JP | 4769924 B1 | 9/2011 |
| JP | 2013014771 A | 1/2013 |
| KR | 10-2004-0082121 A | 9/2004 |
| KR | 10-2011-0006512 A | 1/2011 |
| KR | 10-1084753 B1 | 11/2011 |
| KR | 10-1139641 B1 | 5/2012 |
| RU | 2230078 C2 | 6/2004 |
| WO | 2004/016679 A2 | 2/2004 |
| WO | 2011159059 A2 | 12/2011 |
| WO | 2012/014459 A1 | 2/2012 |
| WO | 2012-014459 A1 | 2/2012 |

OTHER PUBLICATIONS

International Search Report for PCT/KR2013/006480 mailed Oct. 28, 2013 from Korean Intellectual Property Office.
Patent Examination Report of AU2013290920 issued on Apr. 8, 2015.
Chinese Search Report of CN201300360689 issued on Dec. 17, 2015.
European Search Report of EP13819687 issued on Nov. 19, 2015.
Russian Office Action of RU201453512 issued on Feb. 9, 2016.

* cited by examiner

Primary Examiner — Irina S Zemel
(74) Attorney, Agent, or Firm — STIP Law Gorup, LLC

(57) ABSTRACT

Provided is a composition for a foam tire. The composition includes 100 parts by weight of a blend of an olefin block copolymer and a rubber as a polymer matrix, 0.02 to 4 parts by weight of a crosslinking agent, and 1 to 6 parts by weight of a foaming agent. The olefin block copolymer and the rubber are present in amounts of 50 to 80% by weight and 20 to 50% by weight, respectively, based on the total weight of the polymer matrix.

6 Claims, No Drawings

COMPOSITION FOR FOAM TIRE

CROSS REFERENCE TO PRIOR APPLICATIONS

This application is a National Stage Application of PCT International Patent Application No. PCT/KR2013/006480 filed on Jul. 19, 2013, under 35 U.S.C. §371, which claims priority to Korean Patent Application No. 10-2012-0079231 filed on Jul. 20, 2012, which are all hereby incorporated by reference in their entirety.

TECHNICAL FIELD

The present disclosure relates to a composition for a foam tire.

BACKGROUND ART

Tires for vehicles such as automobiles, motorcycles, scooters, bicycles and wheelchairs are divided into two types: tubed and tubeless tires. The tubed tires include an outer rubber shell and an inner rubber tube mounted therein. The tubeless tires have recently been put into practice. The expansive force of air filled in the tires renders the tires cushiony irrespective of the tire type. However, the tires may be punctured by sharp objects such as nails or pieces of glass during use or may lose air pressure when injection valves fail. Further, air permeability of the rubber tubes causes air leakage through gaps between the rubber molecules, inevitably resulting in a drop in air pressure.

In order to solve such shortcomings, new tires have been developed and are currently in use, for example, solid tires composed wholly of a lump of rubber, urethane foam tires made of polyurethane foams, and foam filled tires filled with foams, such as urethane foams, instead of tubes. However, these new tires have the inherent defects despite their advantages. Specifically, the solid tires are robust and protected from going flat but are excessively heavy and cushionless. The urethane foam tires are lightweight but lack elasticity. Other drawbacks of the urethane foam tires are that they are hydrolysable, resulting in poor durability, and undergo rapid surface oxidation when exposed to sunlight. The foam filled tires are heavy, insufficiently elastic, and expensive.

On the other hand, ethylene copolymers foams such as ethylene vinyl acetate (EVA) foams are used in tires for baby carriages and tires for children's bicycles. However, such tires have low grip forces, slippery surfaces, and poor braking performance, limiting their applications to vehicles designed to move slowly and carry low loads, such as baby carriages and children's bicycles. Ethylene copolymers are susceptible to softening at high temperature, particularly, in the summer season, resulting in a reduction in hardness. If an obese person rides a baby carriage or children's bicycle, the tires shake, and as a result, an accident tends to happen. The temperature of asphalt roads rises to about 65° C. at an ambient temperature of about 30° C. The friction between tires and the ground further increases the road temperature to 70-80° C.

DETAILED DESCRIPTION OF THE INVENTION

Technical Solution

According to one aspect of the present disclosure, a composition for a foam tire is provided which includes a blend of an olefin block copolymer and a rubber as a polymer matrix, a crosslinking agent, and a foaming agent.

According to a further aspect of the present disclosure, a composition for a foam tire is provided which includes 100 parts by weight of a blend of an olefin block copolymer and a rubber as a polymer matrix, 0.02 to 4 parts by weight of a crosslinking agent, and 1 to 6 parts by weight of a foaming agent wherein the olefin block copolymer and the rubber are present in amounts of 50 to 80% by weight and 20 to 50% by weight, respectively, based on the total weight of the polymer matrix.

According to another aspect of the present disclosure, a foam tire is provided which is produced by injection molding and foaming the composition.

MODE FOR CARRYING OUT THE INVENTION

The present disclosure will now be described in more detail.

The present disclosure provides a composition for a foam tire which includes a blend of an olefin block copolymer and a rubber as a polymer matrix, a crosslinking agent, and a foaming agent.

The composition may further include one or more additives, including a filler or a pigment, in addition to the crosslinking agent and the foaming agent for processing into a foam. The composition may be produced in the form of sheets or pellets, followed by injection molding in a mold and foaming at a temperature of 150 to 250° C. and a pressure of 100 to 300 kg/cm$^2$ to produce a tire.

The olefin block copolymer (OBC) used in the composition of the present disclosure is a multi-block copolymer. The multi-block copolymer refers to a polymer including two or more chemically distinct zones or segments (also called "blocks") that are preferably bonded in a linear configuration, i.e. a polymer including chemically distinguished units that are bonded end-to-end to polymerized ethylenic functional groups rather than in a pendant or graft configuration. In a particular embodiment, the blocks differ in the amount or type of comonomers incorporated therein, density, degree of crystallization, crystallite size attributed to a polymer of such a composition, the type or degree of stereoregularity (isotactic or syndiotactic), regio-regularity or regio-irregularity, the level of branches, including long-chain branches or hyper-branches, homogeneity, or any other chemical or physical properties. The multi-block copolymer is characterized by the inherent distribution of polydispersity index (PDI or $M_w/M_n$), block length distribution, and/or block number distribution due to the inherent production process of the copolymer. More specifically, the polymer produced in a continuous process may possess a PDI of about 1.7 to about 8 in an embodiment, about 1.7 to about 3.5 in a further embodiment, about 1.7 to about 2.5 in another embodiment, and about 1.8 to about 2.5 in another embodiment, and 1.8 to about 2.1 in another embodiment. The polymer produced in a batch or semi-batch process may possess a PDI of 1.0 to about 2.9 in an embodiment, about 1.3 to about 2.5 in a further embodiment, about 1.4 to about 2.0 in an another embodiment, and about 1.4 to about 1.8 in an another embodiment.

The olefin block copolymer (OBC) refers to an ethylene/α-olefin multi-block copolymer. The olefin block copolymer includes ethylene and one or more copolymerizable α-olefin comonomers in a polymerized form. The olefin block copolymer is characterized by the presence of a plurality of blocks or segments of two or more polymerized monomer units having different chemical or physical properties. In some embodiments, the multi-block copolymer may be represented by the following formula:

(AB)n wherein n is an integer of at least 1, preferably an integer greater than 1, for example, 2, 3, 4, 5, 10, 15, 20, 30, 40, 50, 60, 70, 80, 90, 100 or higher; A represents a hard block or segment; and B represents a soft block or segment. Preferably, A and B are linked in a linear configuration rather than in a branched or star configuration. The hard segment refers to a block of polymerized units in which ethylene is present in a particular amount. In some embodiments, the ethylene content of the hard segment is 95% by weight or more. In further embodiments, the ethylene content of the hard segment is 98% by weight or more. That is, in some embodiments, the content of the comonomers in the hard segment is not greater than 5% by weight. In further embodiments, the content of the comonomers in the hard segment is not greater than 2% by weight. In some embodiments, the hard segment is wholly or substantially composed of ethylene. Meanwhile, the soft segment refers to a block of polymerized units in which the comonomers are present in a particular amount. In some embodiments, the content of the comonomers in the soft segment is 5% by weight or more. In further embodiments, the content of the comonomers in the soft segment is 8% by weight or more, 10% by weight or more, or 15% by weight or more. In further embodiments, the content of the comonomers in the soft segment is 20% by weight or more, 25% by weight or more, 30% by weight or more, 35% by weight or more, 40% by weight or more, 45% by weight or more, 50% by weight or more, or 60% by weight or more.

Suitable monomers for the preparation of the OBC used in the present disclosure include ethylene and one or more addition polymerizable monomers other than ethylene. Examples of suitable comonomers include straight-chain or branched α-olefins having 3 to 30 carbon atoms, preferably 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cycloolefins having 3 to 30 carbon atoms, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; diene and triene olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; 3-phenylpropene; 4-phenylpropene; 1,2-difluoroethylene; tetrafluoroethylene; and 3,3,3-trifluoro-1-propene.

In one embodiment, the olefin block copolymer may have a density of 0.85 g/cc to 0.91 g/cc or 0.86 g/cc to 0.88 g/cc.

In one embodiment, the olefin block copolymer may have a melt index (MI) of 0.1 g/10 minutes to 30 g/10 minutes, 0.1 g/10 minutes to 10 g/10 minutes, 0.1 g/10 minutes to 1.0 g/10 minutes, 0.1 g/10 minutes to 0.5 g/10 minutes, or 0.3 g/10 minutes to 0.6 g/10 minutes, as measured by ASTM D1238 (190° C., 2.16 kg).

In one embodiment, the olefin block copolymer produced in a continuous process may have a polydispersity index (PDI) of 1.7 to 3.5, 1.8 to 3, 1.8 to 2.5, or 1.8 to 2.2. The olefin block copolymer produced in a batch or semi-batch process may have a PDI of 1.0 to 3.5, 1.3 to 3, 1.4 to 2.5, or 1.4 to 2.

In one embodiment, the olefin block copolymer may contain 5 to 30% by weight, 10 to 25% by weight, or 11 to 20% by weight of the hard segment. The hard segment may contain 0.0 to 0.9% by mole of units derived from the comonomers. The olefin block copolymer may contain 70 to 95% by weight, 75 to 90% by weight, or 80 to 89% by weight of the soft segment. The soft segment may contain less than 15% by mole or 9 to 14.9% by mole of units derived from the comonomers. In one embodiment, the comonomer may be butene or octene.

The use of the olefin block copolymer (OBC)/rubber blend in the foam tire composition of the present disclosure enables the production of a tire that can withstand high temperatures and has high grip force and elasticity. In contrast, a single use of the OBC as a polymer matrix component leads to the production of a slippery tire with low grip force. In view of this, the rubber is included in the foam tire composition of the present disclosure. Preferably, the OBC is used in an amount of 50 to 80% by weight and the rubber is used in an amount of 20 to 50% by weight, based on the total weight of the polymer matrix. The use of the rubber in an amount of less than 20% by weight may lead to the production of a slippery tire with low grip force. Meanwhile, the use of the rubber in an amount exceeding 50% by weight may lead to the production of a tire with very low hardness and high shrinkage. The grip force is associated with the driving force of a vehicle, such as an automobile, bicycle or electric-powered wheelchair, to directly affect the energy consumption and speed of the vehicle.

The rubber may be selected from the group consisting of a natural rubber, a synthetic rubber, and a combination thereof.

The natural rubber may be a general natural rubber or a modified natural rubber. The general natural rubber may be one of those known in the art. No particular limitation is imposed on the specification (e.g., the country of origin) of the general natural rubber. The natural rubber includes cis-1,4-polyisoprene as a major component. Alternatively, the natural rubber may also include trans-1,4-polyisoprene depending on what characteristics are required. For example, the natural rubber may be balata, which is a latex obtained from trees of the Sapotaceae family indigenous to America. Balata includes trans-1,4-polyisoprene as a major component. The modified natural rubber refers to a rubber produced by modifying or purifying the general natural rubber. As the modified natural rubber, there may be exemplified epoxidized natural rubber (ENR), deproteinized natural rubber (DPNR), or hydrogenated natural rubber.

The synthetic rubber may be selected from the group consisting of styrene butadiene rubber (SBR), modified styrene butadiene rubber, butadiene rubber (BR), modified butadiene rubber, chlorosulfonated polyethylene rubber, epichlorohydrin rubber, fluorinated rubber, silicone rubber, nitrile rubber, hydrogenated nitrile rubber, nitrile butadiene rubber (NBR), modified nitrile butadiene rubber, chlorinated polyethylene rubber, styrene butadiene styrene (SBS) rubber, styrene ethylene butylene styrene (SEBS) rubber, styrene isoprene styrene (SIS) rubber, ethylene propylene rubber, ethylene propylene diene (EPDM) rubber, hypalon rubber, chloroprene rubber, ethylene vinyl acetate rubber, acrylic rubber, hydrin rubber, vinylbenzyl chloride styrene butadiene rubber, bromomethyl styrene butyl rubber, maleic acid styrene butadiene rubber, carboxylic acid styrene butadiene rubber, epoxy isoprene rubber, maleic acid ethylene propylene rubber, carboxylic acid nitrile butadiene rubber, brominated polyisobutyl isoprene-co-paramethyl styrene (BIMS) rubber, and combinations thereof.

The foaming agent may be any of those known in the art (also known as a pore forming agent or a blowing agent). Examples of foaming agents suitable for use in the composition of the present disclosure include gaseous materials, volatile liquids, and chemical agents that are decomposed into gases and other byproducts. The foaming agent is added to produce a foam and may be, for example, an azo-based compound having a decomposition temperature of 150 to 210° C. The foaming agent may be used in an amount of 1 to 6 parts by weight, based on 100 parts by weight of the polymer matrix. The use of the foaming agent in an amount of less than 1 part by weight may lead to the production of a foam having a specific gravity of 0.7 or more and a Shore C hardness of 70 or more, which are disadvantageous in terms of weight reduction. Meanwhile, the use of the foaming agent in an amount exceeding 6 parts by weight leads to the production of a foam having a specific gravity of 0.10 or less, which is advantageous in terms of weight reduction, but may cause poor mechanical properties and dimensional stability of the foam. If the foaming agent has a decomposition temperature lower than 150° C., early foaming may occur during compounding. Meanwhile, if the foaming agent has a decomposition temperature higher than 210° C., it may take at least 15 minutes to mold into a foam, resulting in low productivity.

Representative examples of suitable foaming agents include, but are not limited to, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane, perfluorocyclobutane, azodicarbonamide (ADCA), azodiisobutyronitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, and trihydrazinotriazine. Generally, ADCA is preferred as the foaming agent.

The crosslinking agent included in the composition of the present disclosure may be an organic peroxide capable of imparting high-temperature viscoelasticity to the resin. The organic peroxide crosslinking agent is used in an amount of 0.02 to 4 parts by weight, preferably 0.05 to 3.0 parts by weight, based on 100 parts by weight of the matrix. The organic peroxide crosslinking agent has a 1 minute half-life temperature of 130 to 180° C. The use of the organic peroxide crosslinking agent in an amount of less than 0.02 parts by weight may lead to insufficient crosslinking, making it difficult to maintain high-temperature viscoelasticity of the resin. Meanwhile, the use of the organic peroxide crosslinking agent in an amount exceeding 4 parts by weight may lead to excessive crosslinking, resulting in a dramatic increase in hardness. Examples of such organic peroxide crosslinking agents include those commonly used in rubber compounding, such as t-butyl peroxy isopropyl carbonate, t-butyl peroxy laurylate, t-butyl peroxy acetate, di-t-butyl peroxy phthalate, t-dibutyl peroxy maleic acid, cyclohexanone peroxide, t-butyl cumyl peroxide, t-butyl hydroperoxide, t-butyl peroxy benzoate, dicumyl peroxide, 1,3-bis(t-butylperoxyisopropyl)benzene, methyl ethyl ketone peroxide, 2,5-dimethyl-2,5-di(benzoyloxy)hexane, 2,5-dimethyl-2,5-di(t-butylperoxy)hexane, di-t-butyl peroxide, 2,5-dimethyl-2,5-(t-butylperoxy)-3-hexane, n-butyl-4,4-bis(t-butylperoxy) valerate, and α,α'-bis(t-butylperoxy)diisopropylbenzene.

The other additives are those commonly used in the production of foams to assist in improving the processing properties of the foams and to improve the physical properties of the foams. Examples of the additives include metal oxides, stearic acid, antioxidants, zinc stearate, titanium dioxide, and co-crosslinking agents. Various pigments may also be used in consideration of desired colors. The additives may be added in a total amount of 4 to 15 parts by weight, based on 100 parts by weight of the matrix. The metal oxide can be used to improve the physical properties of a foam, and examples thereof include zinc oxide, titanium oxide, cadmium oxide, magnesium oxide, mercury oxide, tin oxide, lead oxide, and calcium oxide. The metal oxide may be used in an amount of 1 to 4 parts by weight, based on 100 parts by weight of the matrix. Triallyl cyanurate (TAC) as the co-crosslinking agent is preferably used in an amount of 0.05 to 0.5 parts by weight, based on 100 parts by weight of the matrix. Triallyl cyanurate is used to adjust the molding time of the composition to 5 to 10 minutes when a press is at a temperature of 150 to 170° C. If the co-crosslinking agent is used in an amount of less than 0.05 parts by weight, its effect is negligible. Meanwhile, if the co-crosslinking agent is used in an amount exceeding 0.5 parts by weight, the composition is excessively crosslinked, resulting in the rupture of a foam, similarly to when the crosslinking agent is used in an amount exceeding 1.5 parts by weight.

Stearic acid and zinc stearate induce the formation of fine and uniform foamed cells and facilitate demolding after molding. Stearic acid and zinc stearate each is typically used in an amount of 1 to 4 parts by weight. Examples of the antioxidants include Sonnoc, butylated hydroxy toluene (BHT), and Songnox 1076 (octadecyl 3,5-di-tert-butyl hydroxyhydrocinnamate). The antioxidant is typically used in an amount of 0.25 to 2 parts by weight, based on 100 parts by weight of the matrix. Titanium dioxide is used as a white pigment and performs the same functions as the above-mentioned metal oxides. Titanium dioxide is typically used in an amount of 2 to 5 parts by weight.

The use of the filler in the composition contributes to cost reduction of the composition. Examples of suitable fillers include silica ($SiO_2$), $MgCO_3$, $CaCO_3$, talc, $Al(OH)_3$, and Mg(OH)$_2$. The filler is typically used in an amount of 10 to 50 parts by weight, based on 100 parts by weight of the matrix.

The composition of the present disclosure can be processed by injection molding and foaming to produce a foam tire. In one embodiment, a foam tire may be produced by the following procedure.

First, a blend of the OBC and the rubber is placed in a mixer and is mixed with the crosslinking agent, the foaming agent, and other additives. Then, the mixture is compressed into pellets using suitable equipment such as an extruder. The pellets are injected into a mold of a foaming injection molding machine and are foamed under constant temperature and pressure conditions to produce the final foam. At this time, the mold is designed to have a smaller size by a foaming magnitude of the mixture than the final product. After foaming, the mixture is expanded to the desired size of the product.

As described above, the tire produced using the composition according to one embodiment of the present disclosure is less softened even under high temperature environments and exhibits excellent physical properties in terms of grip force and elasticity.

The present disclosure will be explained in more detail with reference to the following examples. However, these examples are not intended to limit the spirit of the present disclosure.

Examples

Grip force measurement: As shown in Table 1, the components were mixed to prepare compositions for foam tires. Each of the compositions was pelletized and injection molded to produce tires having dimensions of 24"×1.25". The tires were mounted to a wheelchair and the front wheels were fixed such that the wheelchair was allowed to move straight. A 70 kg lump of iron was loaded on the wheelchair. The wheelchair was allowed to descend from a 50 cm high slope inclined at 30°. The running distance until the wheelchair stopped was measured. The larger the running distance, the higher the grip force. The results are shown in Table 1.

A room-temperature hardness lower than 50 Shore C and an 80° C. hardness lower than 50 Shore C were judged to be unsuitable.

A rebound resilience value lower than 45% was judged to be unsuitable.

A running distance (grip force) smaller than 12 m was judged to be unsuitable.

As can be seen from the results in Table 1, the tires of Examples 1-5, each of which was produced using the foam tire composition including a blend of the OBC and the rubber as a polymer matrix, had high grip forces and appropriate rebound resilience values, thus being suitable for practical use. In contrast, the tires of Comparative Examples 1 and 2, each of which did not include the OBC or the rubber component, had low grip forces, the tires of Example 6 including more than 50% by weight of the rubber component was very low in hardness and excessively high in rebound resilience, and the tires of Example 7 including less than 20% by weight of the rubber component had a low grip force, thus being unsuitable for practical use.

The invention claimed is:

1. A composition for a foam tire comprising a blend of an olefin block copolymer and a rubber as a polymer matrix, a crosslinking agent, and a foaming agent,
wherein the olefin block copolymer is a multi-block copolymer which comprises ethylene and one or more copolymerizable α-olefin comonomers in a polymerized form and has a plurality of blocks or segments of two or more polymerized monomer units having different chemical or physical properties, and
wherein the olefin block copolymer and the rubber are present in amounts of 50 to 80% by weight and 20 to 50% by weight, respectively, based on the total weight of the polymer matrix.

2. The composition according to claim 1, wherein the rubber is selected from the group consisting of a natural rubber, a synthetic rubber, and a combination thereof.

3. A composition for a foam tire comprising 100 parts by weight of a blend of an olefin block copolymer and a rubber as a polymer matrix, 0.02 to 4 parts by weight of a crosslinking agent, and 1 to 6 parts by weight of a foaming agent wherein the olefin block copolymer and the rubber are

TABLE 1

| | Comparative Example 1 | Comparative Example 2 | Example 1 | Example 2 | Example 3 | Example 4 | Example 5 | Example 6 | Example 7 |
|---|---|---|---|---|---|---|---|---|---|
| EVA (VA 20%) | 100 | | | | | | | | |
| OBC (specific gravity 0.9) | | 100 | 75 | 75 | 75 | 60 | 60 | 45 | 90 |
| NR | | | 25 | | | 40 | | 55 | 10 |
| SBR | | | | 25 | | | | | |
| CSM | | | | | 25 | | 40 | | |
| ZnO | 5.0 | 5.0 | 5.0 | 5.0 | 5.0 | 5.0 | 5.0 | 5.0 | 5.0 |
| Stearic Acid | 1.0 | 1.0 | 1.0 | 1.0 | 1.0 | 1.0 | 1.0 | 1.0 | 1.0 |
| DCP | 1.0 | 1.0 | 1.0 | 1.0 | 1.0 | 1.0 | 1.0 | 1.0 | 1.0 |
| ADCA | 1.5 | 1.5 | 1.5 | 1.5 | 1.5 | 1.5 | 1.5 | 1.5 | 1.5 |
| Specific gravity | 0.40 | 0.40 | 0.40 | 0.40 | 0.41 | 0.40 | 0.43 | 0.40 | 0.40 |
| Tensile strength (kg/cm$^2$) | 35 | 34 | 40 | 37 | 43 | 50 | 50 | 50 | 36 |
| Elongation (%) | 350 | 350 | 400 | 370 | 400 | 450 | 420 | 450 | 360 |
| Hardness (Shore C, room temp.) | 60 | 60 | 58 | 59 | 59 | 56 | 58 | 49 | 59 |
| Hardness (Shore C, at 80° C.) | 42 | 57 | 55 | 56 | 57 | 53 | 55 | 46 | 56 |
| Rebound resilience (%) | 40 | 43 | 50 | 49 | 49 | 60 | 59 | 62 | 45 |
| Grip force (m) | 10 | 9 | 16 | 15 | 15 | 22 | 21 | 16 | 11 |
| Suitability for tire | Unsuitable | Unsuitable | Suitable | Suitable | Suitable | Suitable | Suitable | Unsuitable | Unsuitable | present in amounts of 50 to 80% by weight and 20 to 50% by weight, respectively, based on the total weight of the polymer matrix, wherein the olefin block copolymer is a multi-block copolymer which comprises ethylene and one or more copolymerizable α-olefin comonomers in a polymerized form and has a plurality of blocks or segments of two or more polymerized monomer units having different chemical or physical properties.

4. The foam tire produced by injection molding and foaming the composition according to claim 1.

5. The foam tire produced by injection molding and foaming the composition according to claim 2.

6. The foam tire produced by injection molding and foaming the composition according to claim 3.

* * * * *